United States Patent
Hocking et al.

(10) Patent No.: US 9,139,784 B2
(45) Date of Patent: Sep. 22, 2015

(54) REDUCING FOULING IN HEAT EXCHANGERS

(75) Inventors: Philippa Hocking, Calgary (CA); Fazle Sibtain, Calgary (CA); Eric Cheluget, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 958 days.

(21) Appl. No.: 13/313,234

(22) Filed: Dec. 7, 2011

(65) Prior Publication Data

US 2013/0149657 A1 Jun. 13, 2013

(51) Int. Cl.
*F23L 15/04* (2006.01)
*C08F 6/12* (2006.01)
*C10G 75/04* (2006.01)
*F28F 19/00* (2006.01)
*C08F 10/02* (2006.01)

(52) U.S. Cl.
CPC ............... *C10G 75/04* (2013.01); *F28F 19/00* (2013.01)

(58) Field of Classification Search
USPC .............. 528/484, 486, 503; 432/29
See application file for complete search history.

(56) References Cited

U.S. PATENT DOCUMENTS 6,180,730 B1 * 1/2001 Sibtain et al. .................. 526/84
7,332,070 B2 * 2/2008 Nishida et al. ........... 208/48 AA

FOREIGN PATENT DOCUMENTS

| CA | 2470887 A1 | 12/2005 |
| CA | 2589957 | 2/2009 |
| JP | 07025946 A | 1/1999 |
| JP | 2000-297114 A | 10/2000 |
| JP | 2004043615 A | 2/2004 |

OTHER PUBLICATIONS

Kabanov, et al., "Pluronic block copolymers: novel functional molecules for gene therapy," Advanced Drug Delivery Reviews 54 (2002) 223-233.*

* cited by examiner

*Primary Examiner* — Fred M Teskin
(74) *Attorney, Agent, or Firm* — Julie L. Heinrich

(57) ABSTRACT

In the solution polymerization of ethylene co and homopolymers the solution leaving the reactor is heated to separate polymer from solvent and residual monomers. Fouling in the heat exchanger may be reduced by adding to the solution from 0.01 to 100 ppm by weight of a polyoxyalkylene compound of the formula $$HO-(CH_2CH_2O)_M[CH_2CH(CH_3)O]_N(CH_2CH_2O)_PH$$

wherein M, N and P each represent the average number of repeating units and M is from 0 to 20, N is from 2 to 50 and P is from 0 to 20 and passing the solution through a heat exchanger to increase its temperature by at least 20° C.

7 Claims, No Drawings

REDUCING FOULING IN HEAT EXCHANGERS

FIELD OF THE INVENTION

The present invention relates to a method of reducing the fouling of a heat exchanger (heater) which comprises adding 0.01 to 100 weight ppm of a polyoxyalkylene compound to a solution comprising 5 to 40 wt %, preferably 5-30 wt %, of a polymer comprising one or more olefins and from 95 to 60, preferably 95 to 70 wt % of solvent comprising one or more $C_{4-8}$ saturated hydrocarbons before heating the solution in the heat exchanger.

BACKGROUND OF THE INVENTION

In petrochemical plants and for reaction process systems for organic compounds such as olefin polymerization heat exchange is a unit process essential for separation systems. If fouling occurs in the heat exchanger, the efficiency of heat exchange is reduced, and the pressure drop across the heat exchanger increases. In extreme cases, it is necessary to terminate production to remove the foulant. In any event it is good practice to seek to reduce build-up that reduces heat exchanger efficiency and could at some point "flake off" and contaminate downstream product(s).

U.S. Pat. No. 7,332,070 issued Feb. 19, 2008 to Nishida et al. assigned to Mitsui Chemicals, Inc. teaches reducing fouling in a cooler by adding one or more nonionic surfactants to a solution containing olefin polymers which is cooled to remove heat of reaction. The patent does not disclose or suggest adding surfactant to a solution containing olefin polymers which is to be heated to phase separate solvent from polymer.

The prevention of fouling of heat exchangers in petroleum refining facilities is illustrated by U.S. Pat. No. 4,200,518 A which discloses a method comprising adding 5 to 99 ppm polyalkylene amine to a hydrocarbon stream. However, the use of polyalkylene amine may raise environmental concerns. JP-A No. 2004-43615 discloses a method of removing fouling materials by adding a dialkyl sulfide to raw oil, but its influence on the environment may also be a concern.

Polyolefins such as polyethylene, polypropylene, ethylene-.alpha.-olefin copolymers and propylene-.alpha.-olefin copolymers are produced by a wide variety of processes such as a solution phase polymerization and gas-phase polymerization. Gas-phase polymerization process results in particulate (granular) (co)polymers, and unlike the solution phase polymerization process, does not need steps such as separation of polymer from a solution.

In the solution phase polymerization process and gas-phase polymerization process, polyolefins are produced by (co)polymerizing olefins in the presence of a solid catalyst such as a solid titanium-based Ziegler-Natta catalyst disclosed in, for example, U.S. Pat. No. 4,952,649 and JP-A No. 7-25946 or metallocene catalyst disclosed in JP-A No. 2000-297114. In those processes, however, as the amount of the product is increased, heat of polymerization is usually increased. One method of removing heat in solution phase polymerization is by withdrawing the polymerizing solution once through a pipe etc. outside of the reactor, passing the solution through a heat exchanger to cool it, and returning it to the reactor. There is also employed a method wherein a part of a gas composed of hydrocarbons such as unreacted monomers (also referred to as "hydrocarbon-containing gas") is withdrawn continuously from a gaseous phase during liquid phase polymerization or from the top of a reactor during gas-phase polymerization, then the hydrocarbon-containing gas is cooled in a heat exchanger to remove heat of polymerization, and the gas (and a partially liquefied gas) is returned as polymerizable monomers to the polymerization reactor. However, fouling in the heat exchanger for polymer recovery is a problem.

In short residence time solution processes (e.g. the residence time of the solution in the reactor is less than about 15 minutes, preferably less than about 10 minutes), the exothermic heat of reaction may be balanced somewhat by the temperature of the reactants being fed to the reactor. The resulting polymer solution leaving the last reactor in a reactor train may be at a temperature from about 150° C. to 225° C. However, in some instances it is desirable to heat the resulting solution prior to polymer recovery by devolatilizing/flashing the solvent. The step of heating the solution is typically conducted by passing the process stream through a heat exchanger. This may result in the above noted drawbacks. Additionally, as the heat exchanger is hot, any buildup of foulant in the heat exchanger may also result in charring of the material which could potentially flake off causing "black specks" in the resultant polymer product.

Canadian Patent application 2598957, in the name of Chelguet et al, assigned to NOVA Chemicals, teaches adding a surface active agent selected from the group consisting of carboxylate, sulfate, phosphate, phosphonate, and sulfonate compounds comprising a branched or un-branched, saturated or unsaturated alkyl group comprising 6 to 30 carbon atoms, and mixtures thereof to a solution of polyolefins prior to subjecting the solution to flashing (devolatilization). The patent does not disclose or suggest the agents of the present invention.

Applicants have found a dearth of art in the field of reducing fouling of heaters for increasing the temperature of ex reactor solutions of polyethylene to assist in polymer recovery.

The present invention seeks to provide a process for reducing fouling in heat exchangers for heating a solution of polymer in a solvent.

SUMMARY OF THE INVENTION

The present invention provides in a process to increase the temperature of a solution comprising from 5 to 40, preferably 5-30, wt % of a polymer comprising one or more olefins and from 95 to 60, preferably 95-70, wt % of solvent comprising one or more $C_{4-8}$ saturated hydrocarbons at an initial temperature from 150° C. to 225° C. the improvement of reducing heat exchanger fouling by adding to the solution from 0.01 to 100 ppm by weight of a polyoxyalkylene compound including polyoxyalkylene glycol and block copolymers thereof, of the formula

$$HO-(CH_2CH_2O)_M[CH_2CH(CH_3)O]_N(CH_2CH_2O)_PH$$

wherein M, N and P each represent the average number of repeating units and M is from 0 to 20, N is from 2 to 50 and P is from 0 to 20 and passing the solution through a heat exchanger to increase its temperature by at least 20° C.

In a further embodiment, the pressure of the solution is from 5 MPa to 18 MPa preferably 6 to 10 MPa.

In a further embodiment, the polymer comprises from 80 to 100 wt % of ethylene and from 20 to 0 wt % of one or more $C_{2-8}$ alpha olefins.

In a further embodiment, the polyoxyalkylene compound is a polypropylene glycol with an average weight average molecular weight (Mw) of not less than 300, preferably not less than 350.

In a further embodiment, the polyoxyalkylene compound is a polypropylene glycol having an average weight average molecular weight (Mw) less than 1500.

In a further embodiment, in the polyoxyalkylene glycol compound the sum of M+P is from 4 to 20.

In a further embodiment, in the polyoxylakylene compound N is from 10 to 50.

In a further embodiment, the polyoxyalkylene compound has a molecular weight (Mw) up to 3500.

In a further embodiment, the polyoxyalkylene compound is a catalyst deactivator.

In a further embodiment, the polyoxyalkylene glycol is used in conjunction with an additional catalyst deactivator.

In a further embodiment, the additional deactivator is selected from the group consisting of $C_{6-10}$ linear or branched carboxylic acids.

DISCLOSURE OF INVENTION

The efficiency of a heat exchanger is a major consideration when determining the volume of polymer solution that may be adequately heated by a given heat transfer fluid. The overall amount of heat transfer depends on a number of factors, including but not limited to the materials used for construction of a heat exchanger, the area of the heat exchange surface (i.e. the number, length and diameter of tubes in the tube sheet of a shell and tube type heat exchanger), the rate of flow of polymer solution and/or the heat transfer fluid through the tube and shell sides of the heat exchanger respectively, whether the flows are parallel counter-current or parallel co-terminus, the nature of fluid flow (turbulent or Newtonian), and the nature and composition of the exchanging fluids.

Optimization of heat transfer is most commonly addressed though the design and construction of the associated heat exchanger equipment. As a result, significant capital investment may be required for making suitable upgrades such as the installation of inserts to increase turbulent flow within the heat exchanger tubes, the use of larger heat exchangers or the use of heat exchangers with more heat exchange capacity. Alternatively, the heat transfer fluid may be heated to higher temperatures, but this requires significantly higher energy input.

However, all of the above goes for naught if the exchanger becomes fouled.

In the solution polymerization of ethylene with one or more comonomers, typically $C_{3-8}$, preferably $C_{4-8}$ alpha olefins, the monomers are typically dissolved in an inert hydrocarbon solvent, typically a $C_{6-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions. Typically, the catalyst may be a Ziegler-Natta type catalyst or a single site type catalyst. Generally the Ziegler-Natta type catalysts comprise a transition metal halide, typically titanium, (e.g. $TiCl_4$), or a titanium alkoxide $(Ti(OR)_4$ where R is a lower $C_{1-4}$ alkyl radical) on a magnesium support (e.g. $MgCl_2$ or BEM (butyl ethyl magnesium) halogenated (with for example $CCl_4$) to $MgCl_2$) and an activator, typically an aluminum compound ($AlX_4$ where X is a halide, typically chloride), a tri alkyl aluminum (e.g. $AlR_3$ where R is a lower $C_{1-8}$ alkyl radical (e.g. trimethyl aluminum), $(RO)_aAlX_{3-a}$ where R is a lower $C_{1-4}$ alkyl radical, X is a halide, typically chlorine, and a is an integer from 1 to 3 (e.g. diethoxide aluminum chloride), or an alkyl aluminum alkoxide (e.g. $R_aAl(OR)_{3-a}$ where R is a lower $C_{1-4}$ alkyl radical and a is as defined above (e.g. ethyl aluminum diethoxide). The catalyst may include an electron donor such as an ether (e.g. tetrahydrofuran etc.). There is a large amount of art disclosing these catalyst and the components and the sequence of addition may be varied over broad ranges.

The catalyst may be a bulky ligand single site catalyst of the formula:

$(L)_n\text{-}M\text{-}(Y)_P$ wherein M is selected from the group consisting of Ti, Zr, and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon, said bulky heteroatom ligand being sigma or pi-bonded to M; Y is independently selected from the group consisting of activatable ligands; n may be from 1 to 3; and p may be from 1 to 3, provided that the sum of n+p equals the valence state of M, and further provided that two L ligands may be bridged.

Non-limiting examples of bridging group include bridging groups containing at least one Group 13 to 16 atom, often referred to a divalent moiety such as but not limited to at least one of a carbon, oxygen, nitrogen, silicon, boron, germanium and tin atom or a combination thereof. Preferably the bridging group contains a carbon, silicon or germanium atom, most preferably at least one silicon atom or at least one carbon atom. The bridging group may also contain substituent radicals as defined above including halogens.

Some bridging groups include but are not limited to a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals selected from the group consisting of $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. —$CH_2CHOHCH_2$—) and the like.

Exemplary of the silyl species of bridging groups are dimethylsilyl, methylphenylsilyl, diethylsilyl, ethylphenylsilyl or diphenylsilyl compounds. Most preferred of the bridged species are dimethylsilyl, diethylsilyl and methylphenylsilyl bridged compounds.

Exemplary hydrocarbyl radicals for bridging groups include methylene, ethylene, propylene, butylene, phenylene and the like, with methylene being preferred.

Exemplary bridging amides include dimethylamide, diethylamide, methylethylamide, di-t-butylamide, diisoproylamide and the like.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined above.

Typically the cyclopentadienyl-type ligand is selected from the group consisting of a cyclopentadienyl radical, an indenyl radical and a fluorenyl radical where the radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

If none of the L ligands is bulky heteroatom ligand then the catalyst could be a bis Cp catalyst (a traditional metallocene) or a bridged constrained geometry type catalyst or tris Cp catalyst.

If the catalyst contains one or more bulky heteroatom ligands the catalyst would have the formula:

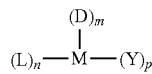

wherein M is a transition metal selected from the group consisting of Ti, Hf and Zr; D is independently a bulky heteroatom ligand (as described below); L is a monoanionic ligand selected from the group consisting of cyclopentadienyl-type ligands; Y is independently selected from the group consisting of activatable ligands; m is 1 or 2; n is 0, 1 or 2; p is an integer; and the sum of m+n+p equals the valence state of M, provided that when m is 2, D may be the same or different bulky heteroatom ligands.

For example, the catalyst may be a bis (phosphinimine), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

The preferred metals (M) are from Group 4 (especially titanium, hafnium or zirconium) with titanium being most preferred. In one embodiment the catalysts are group 4 metal complexes in the highest oxidation state.

Bulky heteroatom ligands (D) include but are not limited to phosphinimine ligands (P1) and ketimide (ketimine) ligands. The phosphinimine ligand (PI) is defined by the formula:

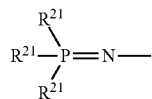

wherein each $R^{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

—Si—$(R^{22})_3$ wherein each $R^{22}$ is independently selected from the group consisting of hydrogen, a $C_{1-8}$ alkyl or alkoxy radical, and $C_{6-10}$ aryl or aryloxy radicals; and a germanyl radical of the formula:

—Ge—$(R^{22})_3$ wherein $R^{22}$ is as defined above.

The preferred phosphinimines are those in which each $R^{21}$ is a hydrocarbyl radical, preferably a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

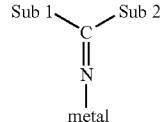

The substituents "Sub 1" and "Sub 2" may be the same or different and may be further bonded together through a bridging group to form a ring. Exemplary substituents include hydrocarbyls having from 1 to 20, preferably from 3 to 6, carbon atoms, silyl groups (as described below), amido groups (as described below) and phosphido groups (as described below). For reasons of cost and convenience it is preferred that these substituents both be hydrocarbyls, especially simple alkyls and most preferably tertiary butyl.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom selected from the group consisting of boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

—(Y)Si$R_x R_y R_z$ wherein the—denotes a bond to the transition metal and Y is sulfur or oxygen. The substituents on the Si atom, namely $R_x$, $R_y$ and $R_z$, are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" are also intended to convey their conventional meanings. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical where the radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The temperature of the reactor(s) in a high temperature solution process is from about 80° C. to about 300° C., preferably from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature will preferably be between 200 and 300° C. The most preferred reaction process is a "medium pressure process", meaning that the pressure in the reactor(s) is preferably less than about 6,000 psi (about 42,000 kiloPascals or kPa). Preferred pressures are from 10,000 to 40,000 kPa (1450-5800 psi), most preferably from about 14,000-22,000 kPa (2,000 psi to 3,000 psi).

The pressure in the reactor system should be high enough to maintain the polymerization solution as a single phase solution and to provide the necessary upstream pressure to feed the polymer solution from the reactor system through a heat exchanger system and to a devolatilization system.

The solution polymerization process may be conducted in a stirred "reactor system" comprising one or more stirred tank reactors or in one or more loop reactors or in a mixed loop and stirred tank reactor system. The reactors may be in tandem or parallel operation. In a dual tandem reactor system, the first polymerization reactor preferably operates at lower temperature. The residence time in each reactor will depend on the design and the capacity of the reactor. Generally the reactors should be operated under conditions to achieve a thorough mixing of the reactants. In addition, it is preferred that from 20 to 60 wt % of the final polymer is polymerized in the first reactor, with the balance being polymerized in the second reactor.

On leaving the reactor the solution should comprise from 5 to 40, preferably 5 to 30, wt % of a polymer comprising one or more olefins and from 95 to 60, preferably from 95 to 70, wt % of solvent at an initial temperature from 150° C. to 225° C. Generally the solution on leaving the reactor will be at a pressure from 5 MPa (about 725 psi) to 18 MPa (2600 psi), preferably from 6 MPa (about 870 psi) to 10 MPa (about 1500 psi).

Typically the polymer will comprise from 80 to 100, preferably 85 to 100, most preferably 90 to 100 wt % of ethylene and from 20 to 0, preferably not more than 15, most preferably not more than 10 wt % of one or more $C_{2-8}$ alpha olefins. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc (e.g. below 0.905 g/cc—the so-called very low and ultra low density polyethylenes).

From 0.01 to 100 ppm by weight of a polyoxyalkylene compound of the formula

$$HO-(CH_2CH_2O)_M[CH_2CH(CH_3)O]_N(CH_2CH_2O)_PH$$

wherein M, N and P each represent the average number of repeating units and M is from 0 to 20, N is from 2 to 50 and P is from 0 to 20 is added to the solution after the last reactor. Generally, the polyoxyalkylene compound is added to the solution in an amount from 0.01 to 100 ppm (by weight), preferably from 1 to 10 ppm (by weight), most preferably from 1 to 5 ppm (by weight based on the weight of the solution).

When M and P are zero, then the polyoxyalkylene compound is polypropylene glycol. Suitable molecular weights for the polypropylene glycol range from not less than about 300 to not more than about 1,500, typically in the 425 to 800 range. N may range from about 5 to 25, preferably from 6 to about 18.

When M and P are integers their values individually may range from 1 to 20, preferably from 1 to 12, and the sum of M+P may range from 4 to 20, preferably from 4 to 10. In some embodiments the values for M and P are the same. N may range from 10 to 50. In these embodiments the polyoxyalkylene compound is a block copolymer of ethylene glycol and propylene glycol. The copolymer may have a molecular weight from about 2500 up to about 3500.

In accordance with the present invention the polyoxyalkylene compound may also act as a catalyst deactivator. In a further aspect of the present invention the polyoxyalkylene compound is used in conjunction with an additional deactivator. Typically the deactivator has a polar group. One suitable class of additional deactivators comprises $C_{4-10}$ alkanoic acids. Preferably the acids comprise from 6 to 8 carbon atoms. Most preferably the deactivator is octanoic acid.

The carboxylic acid deactivator may be added to the solution of polyethylene in solvent in an amount from 1 to 100 ppm (by weight), preferably the compound is added to the solution in an amount from 1 to 10, most preferably from 1 to 5 ppm (by weight).

On or shortly after exiting the last reactor the polyoxyalkylene compound, optionally together with the carboxylic acid deactivator, is added to the solution of polyethylene. Typically the polyethylene is at a temperature from 150° C. to 225° C. and a pressure from about 5 MPa to about 18 MPa, preferably from about 6 to about 10 MPa.

The polyethylene solution is then passed through a heat exchanger to raise its temperature by at least 20° C. typically from 25° C. to 50° C.

The heated solution then passes through a flash tank to remove a substantial amount of the solvent. The solution/polymer is then finished to produce pellets stripped of residual solvent.

The resulting polyethylene may be used in any number of applications. Low density polyethylene may be used in film applications and higher density polyethylene may be used in injection and rotomolding.

In film applications, particularly, it is important that the polyoxyalkylene compound not leave any detectable residue as determined by the naked eye.

The present invention will now be illustrated by the following non limiting examples.

EXAMPLE 1

Screening Experiments

The solubilities of a number of potential candidates were tested in three potential delivery solvents: methyl pentane, cyclohexane, and xylene. Unless otherwise indicated in the table below, sufficient polyoxyalkylene compound was added to the solvent to make a 2.5 wt % solution. The solution was heated to 50° C. and continuously stirred for 30 minutes. At the end of 30 minutes, stirring was stopped and the solution was observed to see if the compound was immiscible or insoluble in the potential delivery solvent. The results are set forth in Table 1 below. In the table EO is ethylene oxide and PO is propylene oxide, misc is miscible, immisc is immiscible and RT is room temperature.

TABLE 1

| Polyoxyalkylene Compound | Molecular Weight | Methyl pentane | Cyclohexane | Xylene |
|---|---|---|---|---|
| EO/PO/EO block copolymer | 1100 | misc | immisc. at RT, miscible hot | not tested |
| EO/PO/EO block copolymer | 2000 | misc. | immisc. at RT, miscible hot | not tested |
| EO/PO/EO block copolymer | 2750 | misc at RT at 2%, clear only at 50° C. at 10% | misc at 10% | misc at 10% |
| EO/PO/EO block copolymer | 3800 | immisc at 2.5% | misc | not tested |
| PO/PE/PO block copolymer | 2150 | misc. | immisc at RT misc hot | not tested |
| PO/EO/PO block copolymer | 3600 | insoluble at RT, cloudy hot (10%) | cloudy at RT, clear hot (10%) | clear after heating (10%) |
| Dipropylene glycol | | immisc | immisc | not tested |
| Polypropylene glycol | 425 | misc. | misc. | not tested |
| Polypropylene glycol | 1000 | misc | misc | not tested |
| Trifunctional polypropylene glycol | 600 | immisc at RT misc. hot but separates on cooling | immisc at RT misc. hot but separates on cooling | | molecular weight of 3600 were tested as 10% solutions in xylene. All other candidates were tested neat.

Additionally 1,2-propanediol (not included in Example 1) was also tested in this manner.

The results are set forth in Table 2.

TABLE 2

| Polyoxyalkylene Compound | Molecular Weight | Result |
|---|---|---|
| EO/PO/EO block copolymer | 1100 | Insoluble precipitate |
| EO/PO/EO block copolymer | 2000 | Insoluble precipitate |
| EO/PO/EO block copolymer | 2750 | No precipitate |
| EO/PO/EO block copolymer | 3800 | Insoluble precipitate |
| PO/EO/PO block copolymer | 2150 | Insoluble precipitate |
| PO/EO/PO block copolymer | 3600 | Cloudy, precipitate after heating |
| 1,2-propanediol | | Cloudy even when hot |
| Polypropylene glycol | 425 | No precipitate |
| Polypropylene glycol | 1000 | No precipitate |
| Trifunctional polypropylene glycol | 600 | Immisc cloudy |

EXAMPLE 2

"Hypovial" Test

A number of candidates from Example 1 were further tested using a "hypovial" method. One ml of surfactant or a surfactant solution was added to 4 g of methylpentane containing soluble residues of a Ziegler-Natta catalyst system. The catalyst residues were present in a concentration significant higher than expected in the heat exchanger (e.g. about 3500 ppm of TiCl4). If no precipitation initially occurred, the vials containing the surfactant and the catalyst residues were heated to 50° C. and allowed to cool to room temperature. The vials were then observed for precipitation. If no precipitation occurred the surfactant was believed worthy of further study.

The EO/PO/EO block copolymer having a molecular weight of 2750 and the PO/EO/PO surfactant having a

EXAMPLE 3

Catalyst Deactivation Unit and Continuous Polymerization Unit Tests

Based on the above results EO/PO/EO block copolymer having an Mw of 2750 and polypropylene glycol having an Mw of 425 were tested in a catalyst deactivation unit and a continuous polymerization unit.

In the catalyst deactivation unit 10 ml of 10 wt % solution of the block copolymer dissolved in xylene or 10 ml of neat polypropylene glycol was added to 90 ml of methylpentane containing the soluble residues of a Ziegler-Natta catalyst prepared in accordance with the hypovial test, and the mixture was heated in a sealed sample cylinder to 200° C. at a pressure from 1.5-2 MPa (250-300 psi) After 60 minutes at 200° C. the cylinder was permitted to cool to room temperature before opening. On opening the methylpentane was evaluated for precipitation. No precipitation was observed for either sample.

The continuous polymerization unit is a small scale continuous solution polymerization reactor in which the solvent was cyclohexane and the catalyst was a Ziegler-Natty catalyst at about 18 ppm TiCl4. 100 mmol/l of surfactant (e.g. about a 0.7 wt % solution) in cyclohexane was metered into the discharge from the reactor at a rate of 120-900 ppm. The solution passed through a block heater at a fixed temperature and was heated. The operation of the block heater was evaluated continuously (inlet temperature and outlet temperature) to evaluate the efficiency of the heater over a 12 hour period. Little to no change in post heater temperature was observed. This was a "good" rating for each surfactant.

EXAMPLE 4

Short Pilot Plant Run

The polymerization was conducted in a solution phase continuously stirred tank reactor (CSTR). The reactor pressure was about 16 MPa. The outlet temperature from the reactor was about 190° C. The reactor exit was fitted with a near Infrared spectrometer probe as described in Canadian patent application 2,470887 laid open for public inspection Dec. 14, 2005 in the name of Lacombe et al. assigned to NOVA Chemicals Corporation (corresponding to U.S. Pat. No. 7,566,571 issued Jul. 28, 2009 to Lacombe et al.). After exiting the reactor the polymer solution passed through a heat exchanger to raise its temperature to about 230-250° C.

Solutions of EO/PO/EO block copolymer having an Mw of 2750 and polypropylene glycol having an Mw of 425 were prepared at 2 wt % in methyl pentane.

The reactor was operated to polymerize an ethylene octene copolymer in the presence of a Ziegler-Natta catalyst at a concentration from 2.8 to 3.7 ppm $TiCl_4$. The solutions were being tested as deactivators. The solutions were added proximate to the exit from the reactor. The amount of additive was increased stepwise over time. The temperature and conversions were monitored to determine the point at which the additives deactivated the catalyst. Then the additive levels were increased by two and four times to determine if there were any unwanted effects. The baseline of the NIR detector (used as an indicator of fouling) was not increased over the baseline for the conventional deactivator. There was no increase in the isomerization of the comonomer or impurities in the ethylene monomer. Both compounds were effective as deactivators.

EXAMPLE 5

Longer Term Pilot Plant trial

A longer term comparison was conducted comparing a 2 wt % solution of an EO/PO/EO block copolymer having a molecular weight of 2750 as a deactivator with a mixed solution (1 wt %) each of the EO/PO/EO and the conventional deactivator ($C_{6-8}$ alkanolic acid). The reactor was as described in Example 4 and operated in the same manner. The additives were added proximate the exit of the second reactor in an amount to provide concentrations from 3.4 to 4.5 ppm of total deactivator at a Ziegler-Natta concentration ranging from 2.9 to 3.4 ppm $TiCl_4$. Solvent baselines were measured before and after the trial to determine if there was any gross fouling. No gross fouling was detected.

The blended deactivator showed a better heat transfer than the EO/PO/EO block polymer on its own. The blended solution was at least as good as the conventional deactivator. No increase in heat exchanger fouling was observed in the comparison.

What is claimed is:

1. In a process to increase the temperature of a solution comprising from 5 to 40 wt % of a polymer comprising from 80 to 100 wt % of ethylene and from 20 to 0 wt % of one or more $C_{2-8}$ alpha olefins and from 95 to 60 wt % of solvent comprising one or more $C_{4-8}$ saturated hydrocarbons at an initial temperature from 150° C. to 225° C. and a pressure from 5 MPa to 18 MPa the improvement of reducing heat exchanger fouling by adding to the solution from 0.01 to 100 ppm by weight of a polyoxyalkylene compound of the formula

$$HO-(CH_2CH_2O)_M[CH_2CH(CH_3)O]_N(CH_2CH_2O)_PH$$

wherein M, N and P each represent the average number of repeating units and M is from 0 to 12, N is from 2 to 50 and P is from 0 to 12 provided that when M and P are 0 the polyoxyalkylene compound has a weight average molecular weight from 300 to 1500 and when one of N or M are present the polyoxyalkylene compound has a weight average molecular weight from 2500 to 3500, and passing the solution through a heat exchanger to increase its temperature by at least 20° C.

2. The process according to claim 1, wherein the polyoxyalkylene compound is a polypropylene glycol.

3. The process according to claim 1, wherein in the polyoxyalkylene compound the sum of M+P is from 4 to 20.

4. The process according to claim 3 wherein in the polyoxyalkylene compound N is from 10 to 50.

5. The process according to claim 1, where in the polyoxyalkylene compound is a catalyst deactivator.

6. The process according to claim 5 where the polyoxyalkylene compound is used in conjunction with an additional catalyst deactivator.

7. The process according to claim 6, wherein the additional deactivator is selected from the group consisting of $C_{6-8}$ alkanoic carboxylic acids.

* * * * *